June 6, 1950 R. M. JOHNSTON 2,510,402
BAROMETER
Filed March 15, 1948

INVENTOR.
ROBERT M. JOHNSTON
BY

Patented June 6, 1950

2,510,402

UNITED STATES PATENT OFFICE 2,510,402

BAROMETER

Robert M. Johnston, San Luis Obispo, Calif.

Application March 15, 1948, Serial No. 15,016

13 Claims. (Cl. 73—387)

This invention relates to clock-controlled barometers, and more particularly to a barometer having in combination therewith a dial movable by a clock mechanism in accordance with diurnal pressure changes to facilitate reading changes in atmospheric pressure on the barometer.

As is well known, wholly aside from movements of high and low pressure systems, diurnal pressure changes occur in every given locality. These changes are indicated by a barometer on the conventional dial as they occur hour by hour and can be misleading since they might tend to indicate a rising or falling barometer when there is no such change occurring through migratory barometric changes.

An important object of the present invention is to provide a barometer or barograph having combined therewith novel clock-operated means, separate from the conventional barometer dial which is stationary, for compensating with respect to the barometer pointer for normal diurnal pressure changes.

A further object is to provide a barometer with a second dial operative adjacent the conventional stationary dial and readable in conjunction with the barometer pointer, and to provide a clock-operated cam mechanism so designed as to move such additional dial back and forth in accordance with normal diurnal pressure changes whereby, unless moving pressure areas affect the mechanism, the operator may readily determine that no rise or fall in the barometer reading is occurring.

A further object is to provide such a mechanism wherein a standard clock mechanism is employed for rotating a shaft in a given direction once every twenty-four hours and to provide a cam mechanism operative between such shaft and a second barometer dial so that the latter shifts in accordance with normal diurnal pressure changes, and to provide means whereby the setting of the cam mechanism relative to the shaft may be changed in accordance with the longitudinal geographic position of the barometer in a given time zone, to thus properly operate the second barometer dial in accordance with normal diurnal pressure changes occurring in that particular locality.

Other objects and advantages of the invention will become apparent during the course of the following description.

In the drawing I have shown one embodiment of the invention. In this showing

Figure 1:
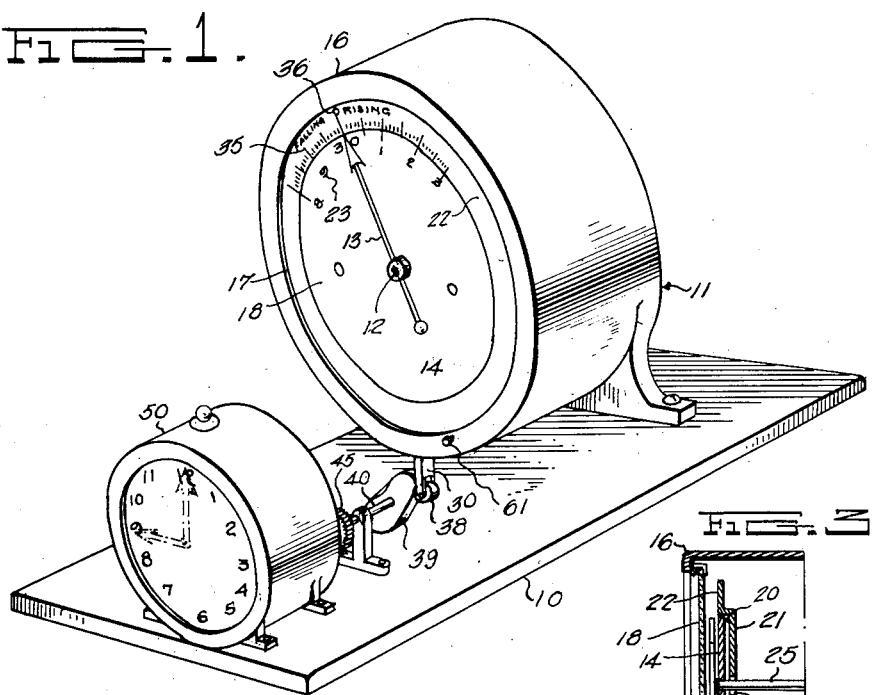
Figure 1 is a perspective view of a combined barometer and clock mechanism.

Referring to Figure 1, the numeral 10 designates a suitable base on which is mounted a barometer 11, which is conventional except as described below and may be, for example, of the aneroid type. The barometer 11 is provided with the usual shaft 12 carrying an indicator pointer 13 operative over a stationary dial 14. The shaft 12 is operated in the usual manner by conventional atmospheric pressure responsive means to move the pointer 13 in accordance with changes in barometric pressure. The means for operating the shaft 12 being conventional and forming no part of the present invention, it has been omitted from the drawing.

Figure 3:
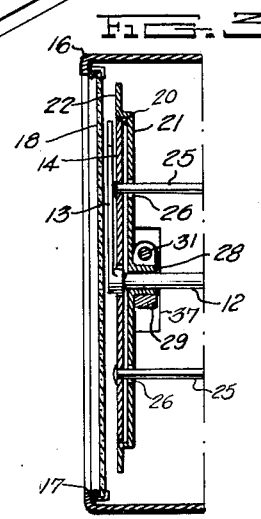
Figure 3 is a fragmentary sectional view on line 3—3 of Figure 2, parts being broken away and parts being omitted.
Figure 2:
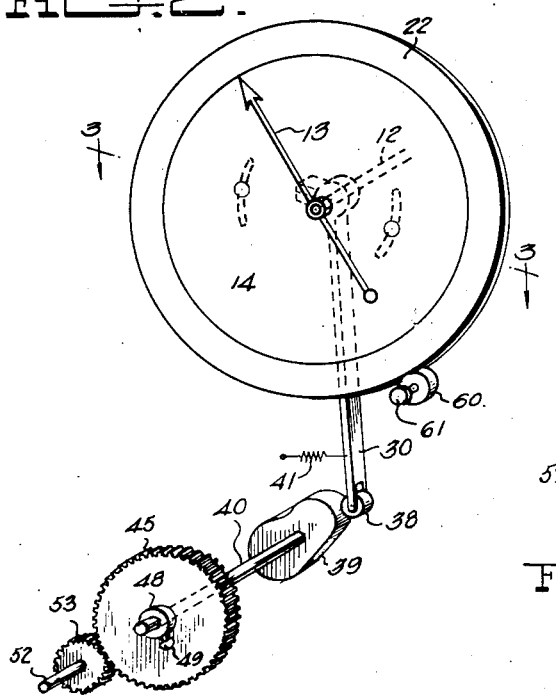
Figure 2 is a perspective view, largely diagrammatic, indicating the relative arrangement of the dials and the cam operating mechanism for the second dial.

The dial 14 is arranged within a conventional casing 16, open-faced as at 17 and preferably covered with the usual glass 18. The dial 14 is arranged in a recess 20 formed in an auxiliary dial 21 having an outer annular portion 22 lying in a common plane with the dial 14. The latter dial, as shown in Figure 1, is provided with the usual calibrations 23 through which barometric readings may be ascertained in accordance with movement of the pointer thereover. The dial 14 is stationary in accordance with conventional practice and may be supported in any suitable manner by horizontally extending posts 25 operating in arcuate slots 26 formed in the dial 21 (Figure 3).

Means are provided for supporting the dial 21 and its face portion 22 for movement about the axis of the shaft 12 independently thereof and for effecting such movement in accordance with normal diurnal pressure changes. For example, the dial plate 21 may be provided with an axial collar 28 (Figure 3) surrounding the shaft 12 but freely relatively rotatable thereon. The collar 28 may be arranged within a split collar 29 carried by a downwardly extending arm 30. The collar 29 may be tightened to the desired extent on the collar 28 by a screw 31 to thus provide sufficient friction between the collars 28 and 29 whereby the arm 30, when turned on the axis of the shaft 12, will correspondingly turn the dial plate 21 and its face 22. Such dial face is therefore variable in its position relative to the pointer 13 and is suitably calibrated as at 35. These calibrations start from zero as at 36 and correspond in division to the calibrations 23. The calibrations on the dial face 22 are supplemented by the words "falling" and "rising" so that general barometric changes as indicated between the pointer 13 and dial face 22 will be readily apparent.

The lower end of the arm 30 projects through an opening 37 in the barometer casing and is provided with a roller 38 engageable with a cam 39 mounted on a shaft 40. The roller 38 thus forms a follower for the cam 39 and is held in engagement with the cam 39 in any suitable manner, for example, by a light spring 41.

The shaft 40 carries a gear 45. As will become apparent, it is desirable that the gear 45 and cam 39 be relatively circumferentially adjustable so as to provide adjustment for the present device in accordance with its geographic location as to longitude in a given time zone. For this purpose, the gear 45 may be provided with a collar 48 carrying a set screw 49 for fixing the gear 45 to the shaft 40 in any adjusted position.

The shaft 40 is operated through the medium of a conventional clock or chronometer 50. Such time piece may be of either the 12 or 24-hour type and is suitably connected to the shaft 40 in accordance with the type employed. In the present instance the time piece is a conventional clock, and accordingly a shaft 52, suitably driven by the hour hand of the clock at the same speed, is provided with a pinion 53 meshing with the gear 45. Accordingly the gear 45 makes one complete revolution every 24 hours.

Figure 4:
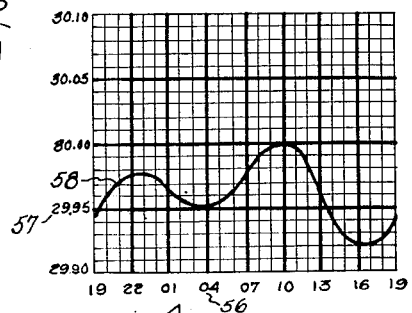
Figure 4 is a face view of a graph indicating normal diurnal pressure changes for a given area.

In Figure 4 I have shown a partial graph having coordinance respectively calibrated in hours as at 56 and in barometric pressures as at 57. A curve 58 is plotted on the graph to indicate normal diurnal pressure changes during the hours of the day indicated by the ordinates 56. As this graph indicates, normal diurnal pressure changes occur from hour to hour regradless of the shifting of migratory high and low pressure systems. In a conventional barometer, the pointer will operate over the scale to indicate such successive rising and falling in barometric pressures and it will be obvious that any one, and particularly an inexperienced person, might well be misled between the hours of 10:00 and 16:00 into believing that a steady drop in barometric pressures may be occurring and that this might indicate the approach of a storm area. The present device provides easily readable means for determining whether there are any atmospheric pressure changes taking place other than those occurring through normal diurnal variations. This determination of pressure changes is provided through the medium of the scale face 22, and this face together with its dial plate 21 are adjustable by means of a friction wheel 60 (Figure 1) engageable with the outer edge of the dial face 22 and operable by a finger wheel 61. Ordinarily, this adjustment is used merely for setting the dial face 22 relative to the zero mark 36 when pressure is normal at any given time.

*Operation*

In any given location in which the device will be used, the cam 39 and gear 45 may be relatively adjusted to each other in accordance with the geographical longitude of such place by loosening the screw 49, turning the wheel 45, and then tightening the screw. However, such adjustment may be likewise provided by turning the finger wheel 61. The cam 39 must be reset for widely differing localities since the normal diurnal pressure change curves vary slightly in shape and considerably as to the timing of the maximum and minimum points of the curve. However, for any given locality the cam is rarely reset, since the characteristic diurnal pressure change curve will not vary appreciably regardless of the actual existing pressure at any one time.

The only operation necessary to determine pressure changes during any given period is the setting of the pressure change dial 22 by operating the wheel 60 so that the zero setting of the dial 22 is coincident with the barometer needle showing the actual pressure. Then, regardless of whether the actual pressure is extremely high or low, the cam 39 reproduces the typical diurnal fluctuation on the pressure change dial 22. In this connection it is pointed out that it is the shape of the curve (Figure 4) and not the actual pressure value that is important. Therefore, if the dial 22 is set with the zero point coinciding with the barometer needle when the latter is not indicating the diurnal pressure, the zero point on the dial 22 will move in accordance with the curve 58. Accordingly actual changes in pressure with relation to the variations in the diurnal pressures will be indicated.

If, during any period of observation, no pressure changes are taking place, i. e., if there is no movement of high and low pressure systems and/or no dynamic deepening or filling of existing high and low pressure systems, the barometer needle will show the typical diurnal fluctuations. The zero mark on the pressure change dial 22 will then naturally remain coincident with the needle.

The cam 39 is designed in accordance with normal diurnal pressure variations and accordingly will swing the dial face 22 back and forth in accordance with diurnal variations indicated by the chart in Figure 4, which of course is assumed to be the chart for the given locality in which the device is employed. If pressure variations during any given 24-hour period are normal, then it will be apparent that the zero mark 36 will always be in registration during such period with the pointer 13. Any variation in position between the zero mark 36 and the pointer 13 will indicate a variation from normal pressure and the degree of such variation. Obviously if any substantial barometric pressure change occurs independently of normal diurnal variations, there will be a substantial deviation of the needle 13 with respect to the zero mark 36, thus indicating the approach of high or low pressure areas which are wholly independent of normal diurnal variations.

Accordingly it will be apparent that the present device employs a clock or chronometer mechanism in conjunction with an auxiliary barometer dial to cause such dial to duplicate, in effect, movements of the needle or pointer 13 which would normally occur through successive 24-hour periods, and thus would indicate no deviation from normal except under conditions other than normal. Accordingly the device readily indicates substantial rising or falling in barometric pressures while at the same time the actual barometric pressure may be ascertained in the usual manner by reading of the pointer 13 relative to the calibrations 23.

For extreme accuracy in duplicating the normal diurnal pressure curve 58 for each given locality, it obviously would be desirable to cut separate cams for localities of widely differing latitudes and/or areas with known pecularities in diurnal pressure changes.

I claim:

1. In combination with a barometer having an indicating pointer, a dial movably supported adjacent said pointer, and means for moving said dial in accordance with normal diurnal atmospheric pressure variations.

2. In combination with a barometer having an indicating pointer, a dial movably supported adjacent said pointer, and means comprising a clock mechanism for moving said dial during a given period of time in accordance with normal diurnal atmospheric pressure variations and to an extent corresponding to the extent to which such variations would move said pointer.

3. In combination with a barometer having an indicating pointer, a dial movably supported adjacent said pointer, and means comprising a clock mechanism and a cam device driven thereby for moving said dial throughout a given period of time in accordance with normal diurnal atmospheric pressure variations and to an extent corresponding to the extent of movement of said pointer under the influence of the same variations.

4. In combination with a barometer having an indicating pointer, a dial movably supported adjacent said pointer, and means for moving said dial in accordance with normal diurnal atmospheric pressure variations during a given period of time to an extent corresponding to the extent of movement of said pointer under the influence of the same variations, said means comprising a clock mechanism, a cam operated thereby, and an arm connected between said cam and said dial for operating the latter in accordance with the formation of said cam.

5. In combination with a barometer having an indicating pointer, a dial movably supported adjacent said pointer, and means for moving said dial in accordance with normal diurnal atmospheric pressure variations during a given period of time to an extent corresponding to the extent of movement of said pointer under the influence of the same variations, said means comprising a clock mechanism, a shaft driven by said clock mechanism, a rotary cam carried by said shaft and designed to provide a profile corresponding to normal diurnal atmospheric pressure variations, and an arm having one end engageable with said cam and connected at its other end to said dial.

6. In combination with a barometer having an indicating pointer, a dial movably supported adjacent said pointer, and means for moving said dial in accordance with normal diurnal atmospheric pressure variations during a given period of time to an extent corresponding to the extent of movement of said pointer under the influence of the same variations, said means comprising a clock mechanism, a shaft driven by said clock mechanism, a rotary cam carried by said shaft and designed to provide a profile corresponding to normal diurnal atmospheric pressure variations, an arm having one end in operative engagement with said cam, and means carried by the other end of said arm frictionally engaging said dial to transmit movement of said arm thereto.

7. The combination set forth in claim 6 provided with an adjusting device for circumferentially adjusting said cam relative to said clock mechanism to adjust the setting of said cam relative to the geographical longitude of the place of use of the combination.

8. In combination with a barometer having a shaft rockable on its axis in accordance with barometric changes, and a pointer carried by said shaft, a movable dial supported by said shaft for turning movement on the axis thereof and having calibrations thereon readable in conjunction with said pointer, and means comprising a clock mechanism for rotating said dial relative to said shaft in accordance with normal diurnal atmospheric pressure variations occurring during a given period of time.

9. In combination with a barometer having a shaft rockable on its axis in accordance with barometric changes, and a pointer carried by said shaft, a movable dial supported by said shaft for turning movement on the axis thereof and having calibrations thereon readable in conjunction with said pointer, and means comprising a clock mechanism and a cam device driven thereby for turning said dial on the axis of said barometer shaft in accordance with normal diurnal atmospheric pressure variations occurring over a given period of time.

10. In combination with a barometer having a shaft rockable on its axis in accordance with barometric changes, and a pointer carried by said shaft, a movable dial supported by said shaft for turning movement on the axis thereof and having calibrations thereon readable in conjunction with said pointer, and means for turning said dial on said barometer shaft in accordance with normal diurnal variations in atmospheric pressure, said means comprising a clock mechanism, a rotary cam driven thereby and having a profile designed in accordance with such atmospheric pressure variations, and means for transmitting movement from said cam to said dial.

11. In combination with a barometer having a shaft rockable on its axis in accordance with barometric changes, and a pointer carried by said shaft, a movable dial supported by said shaft for turning movement on the axis thereof and having calibrations thereon readable in conjunction with said pointer, and means for turning said dial on said barometer shaft in accordance with normal diurnal variations in atmospheric pressure, said means comprising a clock mechanism, a rotary shaft driven thereby, a rotary cam carried by said shaft and having a profile corresponding to normal diurnal atmospheric pressure variations, and an arm rotatably supported by said barometer shaft, one end of said arm having mechanical engagement with said cam and the other end of said arm being connected to said dial.

12. In combination with a barometer having a shaft rockable on its axis in accordance with barometric changes, and a pointer carried by said shaft, a movable dial supported by said shaft for turning movement on the axis thereof and having calibrations thereon readable in conjunction with said pointer, and means for turning said dial on said barometer shaft in accordance with normal diurnal variations in atmospheric pressure, said means comprising a clock mechanism, a rotary shaft driven thereby, a rotary cam carried by said shaft and having a profile corresponding to normal diurnal atmospheric pressure variations, an arm supported by said barometer shaft and rotatable relative thereto, one end of said arm having mechanical engagement with said cam, and friction means for transmitting movement of said arm to said dial.

13. The combination set forth in claim 12 provided with means for circumferentially adjusting said rotary shaft relative to said clock mechanism to adjust the position of said cam in accordance with the geographical longitude of the place of use of said combination.

ROBERT M. JOHNSTON.

No references cited.